United States Patent

[15] 3,642,496

Gibson

[45] Feb. 15, 1972

[54] METHOD OF MAKING A BACON-CONTAINING FOOD PRODUCT

[72] Inventor: Lloyd R. Gibson, Zanesville, Ohio

[73] Assignee: Food Methods, Inc., Zanesville, Ohio

[22] Filed: July 29, 1969

[21] Appl. No.: 845,909

[52] U.S. Cl. .................................... 99/107, 99/108, 99/109
[51] Int. Cl. ................................. A22c 11/00, A22c 18/00
[58] Field of Search ........................... 99/107, 108, 109, 194

[56] References Cited

UNITED STATES PATENTS

| | | | |
|---|---|---|---|
| 1,976,165 | 10/1934 | Frank | 99/109 |
| 2,447,427 | 8/1948 | Oftedahl | 99/108 |
| 3,536,499 | 10/1970 | Oberlin | 99/108 |

*Primary Examiner*—Hyman Lord
*Attorney*—Oberlin, Maky, Donnelly & Renner

[57] ABSTRACT

A food product in which bacon ends are utilized, and method for making the same. Bacon ends lack natural cohesion when cooked in a pattie or other similar form. The invention involves grinding or chipping the bacon ends, and adding to the bacon end pieces a meat addition which is high in protein content, an edible food substance which is high in albumin content, and a protein filler. Water also is added, and the above are mixed and shaped into a suitable form, while maintained at a temperature in the range of about 10° F. to about 45° F. The amount of meat addition, albumin containing food substance, and filler added to the bacon end pieces is sufficient to prevent disintegration of the food product during cooking.

4 Claims, No Drawings

METHOD OF MAKING A BACON-CONTAINING FOOD PRODUCT

The present invention relates to a food product and method for making the same, and in particular to a novel method and means for utilizing bacon ends, heretofore considered a low value material.

The present invention is particularly applicable to a method for making a bacon pattie utilizing bacon ends, and will be described with particular reference thereto, although it will be appreciated that the invention has broader application; for instance, in a method for making a sausagelike item in which bacon ends are used.

BACKGROUND OF THE INVENTION

Bacon ends are derived from slicing a slab of bacon. In the slicing process, it is impossible to cut perfect slices of bacon and utilize all of the slab. There are always pieces of the slab which are not utilized, for instance, the ends of the slab before and after the first and last cuts. These pieces are categorized as "bacon ends" and, on the average, it is expected that a 10 percent loss of the sausage will occur.

Heretofore, it has been impossible to use the so-called bacon ends, other than by further processing, such as rendering, or use as an additive filler in other sausage products. Such use results in recovering only a small fraction per pound of the price which is obtained for sliced bacon.

Prior efforts to develop an edible food product which utilizes the bacon ends other than as stated in the next paragraph above heretofore have been unsuccessful, primarily because there is a lack of natural binder in that part of the animal from which bacon comes. During the cooking process, the bacon pieces fail to stay together and the product falls apart.

Such a product also suffers from severe shrinkage. It is apparent that a much higher price than that obtained from a filler use is obtainable for an edible food product, such as a bacon pattie, which utilizes the bacon ends.

Accordingly, it is a principal object of the present invention to provide an edible food product which utilizes bacon ends.

It is further an object of the invention to develop a formulation which utilizes bacon ends, and which on cooking holds together without excessive shrinkage.

It is further an object of the invention to provide a formulation for a food product utilizing bacon ends in which the absence of natural cohesiveness in the bacon ends is compensated for by the addition of edible food substances which are high in natural binder content.

These and other objects are achieved in accordance with the present invention by first grinding or chipping the bacon ends into small particles, and adding components to the bacon end particles including a meat addition which is high in protein content, at least one edible food substance having a high albumin content, a high protein filler and water. The above are mixed and shaped into a suitable form, for instance a pattie, at a temperature in the range of about 10° F. to about 45° F.

Preferably, the meat addition is obtained by adding to the bacon ends a portion of the hog which is high in animal gelatin content and protein, such as ground ham shanks, or picnic ham (the shoulder portion of the hog), supplemented by the addition of eggwhite.

In a preferred embodiment of the present invention, the bacon ends are frozen and chipped in a meat chipper. The frozen chips are then mixed with at least 8 percent ground meat addition, about 10 to 25 percent water, egg white, and an amount of a grease retaining substance and high protein filler, such as G1 301 Soy Protein (trademark Griffith Laboratories). The Soy Protein is a protein concentrate covered in U.S. Pat. No. 2,881,076, and described as defatted soybean meal comprising primarily the fibrous and raw protein elements of the soybean material insoluble in water at a pH in the range of 4.0 to 4.8. An edible inorganic alkali or buffering agent is added to the soybean meal to elevate the pH.

To the accomplishment of the foregoing and related ends, the invention, then, comprises the features hereinafter fully described, the following description setting forth in detail certain illustrative embodiments of the invention, these being indicative, however, of but certain of the various ways in which the principles of the invention may be employed.

DETAILED DESCRIPTION

The invention is best described by way of a specific example in which the bacon ends are used in the production of a bacon pattie.

Cured bacon ends obtained from slicing a slab of bacon, preferably are frozen and then chipped in a meat chipper to produce pieces of bacon approximately one-fourth inch in thickness and weighing from 6 to 8 ounces per chip. A wide variation is possible in the weight of the chips, their weight preferably being above 2 ounces. The chips can be formed by grinding, chopping or other suitable means, although in chip form, the pattie has optimum consistency and flavor.

A meat addition, consisting of a portion of the animal with a high gelatin and protein content, such as cured ham shanks from boneless ham or semiboneless ham, is ground through a pair of conventional sausage plates, preferably having multiple 1/16-inch holes. Again a wide variation is possible in the grind of meat produced, although with respect to the production of bacon patties, the use of 1/16-inch hole plates results in a proper consistency of the pattie and also in optimum dispersion of the meat addition through the pattie on further processing.

The still frozen chipped bacon ends and meat addition (ground ham shanks) are placed in a grinder hopper in alternating layers with a layer of the ground ham shanks on top of a layer of the chipped bacon ends, etc. In this example, they are added in the ratio of eighty pounds of bacon ends to twenty pounds of ham shanks. The ratio of ham shanks to bacon ends should be at least about 8 percent.

The above after grinding are mixed with the following components, per 100 lbs. bacon ends and ham shanks:

| | |
|---|---|
| Water | 13 lbs. |
| G1 301 Soy Protein powder (trademark Griffith Laboratories) | 5 lbs. |
| Dried Powdered eggwhite | 1 lb. |
| Flavor Zest (trademark Griffith Laboratories — includes salt, dextrose, 13.25% monosodium glutamate, pepper and other spices purchased from Griffith Laboratories) | 1½ lb. |
| Liquid Smoke (smoke flavoring in liquid form known to industry) | 8 ozs. |

The mixture forms an "emulsion" (so-called in the trade), which is maintained at a temperature in the range of about 10° to about 45° F. After thorough mixing, the mixture is formed by a "Hollymatic" pattie machine or a similar machine into patties.

Preferably, the formed patties are frozen, packaged and marketed as a frozen product, although they may be precooked before freezing, or treated in other convention ways.

The temperature of the "emulsion" is important, best results being obtained with an "emulsion" between about 20° F. and about 40° F., and preferably between about 30° F. and about 35° F. If the "emulsion" is too warm, it becomes sticky and gummy, and if too cold, the pattie cannot be formed.

Although it is not absolutely necessary to freeze the bacon ends before chipping, this has the advantage that the frozen particles assist in holding down the temperature of the "emulsion" to that desired for the formation of the patties. The room containing the pattie machine should be maintained at less than 50° F. which is now required by federal regulation, so that by use of frozen bacon pieces, normally it is not necessary to chill the forming machine.

Freezing the bacon ends before chipping also has the advantage that uniform discrete particles of bacon end pieces can be formed in the chipping process.

The amount of water added to the "emulsion" also is important, for proper consistency of the emulsion in forming the patties. The amount of water can vary between about 10 pounds and about 25 pounds (per 100 pounds bacon ends and ham shanks), and preferably is in the range of 10 to 17 pounds.

Meat additions other than ham shanks can be used to make up the "emulsion." The advantage in the use of ham shanks is that in addition to being high in gelatin, protein and binder content, the ham shanks are compatible with respect to flavor and consistency with the bacon chips towards production of a bacon pattie. In addition, this utilizes another rather low value portion of the ham. However, gelatin is a partially water soluble albuminous substance that is found in many animal tissues, including skin, cartilage, and bones and can be obtained from other parts of the animal. For instance, cured picnic ham (a low value meat from the shoulder portion of the ham) is high in gelatin and protein content and can very satisfactorily be used.

The meat addition serves two important functions. In addition to the function of supplying natural binder in the form of gelatin and protein, compensating for the lack of natural binder and cohesiveness in the bacon ends, it also adds needed body to the pattie. Gelatin of course is a form of protein (as is the albumin of eggwhite), and since all proteins act as natural binders, a still further substitute meat addition is any suitably flavored lean high protein meat from swine or beef cattle.

However, ham shanks and picnic hams are preferred as the meat addition because of price, flavor compatibility, their high gelatin content, consistency and other properties.

There is no particular upper limit on the amount of meat addition (for instance, ham shanks) that need be added. Ham shanks are a more expensive material than bacon ends, however, and the cost of adding ham shanks usually sets the practical upper limit. Preferably, at least 7 pounds ham shanks should be added for 80 pounds of chipped bacon ends (about 8 percent by weight mixture) to obtain body and cohesiveness in the pattie.

Although eggwhite preferably is added as a binder to supplement the gelatin and protein content of the ham shanks, particularly when the bacon ends are being utilized in pattie form, other albuminous food substances can be used. Eggwhite is preferred because it is high in albumin. The combination of 20 pounds ham shanks and one pound eggwhite produces a very cohesive, firm pattie on cooking.

The purpose of the Soy Protein filler is to retain grease in the pattie during the cooking process as well as being an additional binding agent. Without such a composition, the pattie is subject to shrinkage. A substitute for G1 301 would be any similar concentrate high protein filler-binder approved by the Department of Agriculture. G1 301 is preferred as it best prevents shrinkage.

Flavor Zest and liquid smoke are added for flavor purposes, liquid smoke being a type of product made by several manufacturers.

It is not necessary to use the bacon ends in pattie form. Instead, the emulsion may be extruded through a machine such as a sausage machine and provided with a casing in the same way sausage is provided with a casing. The "emulsion" can be rolled into a wafer form or even chipped form, or can be made as a precooked loaf. Depending upon the use of the bacon ends, the amount of meat addition, eggwhite and filler obviously can vary, or other additions than those listed can be used, for instance, a cereal ingredient.

Also, although the invention has been described in terms of utilizing bacon ends, it is obvious that the principles of the invention are applicable to making a pattie or other product using the whole piece of bacon slab rather than just the ends. This would increase the cost of the pattie, or other product, but could be justified if the demand is sufficient. Accordingly, in its broadest aspect, the invention resides in a method or means for holding pieces of bacon together during cooking.

Other alternatives or embodiments of the present invention, within the scope of the following claims, will be apparent to those skilled in the art.

I, therefore, particularly point out and distinctly claim as my invention:

1. A method of making a food product comprising the steps of chipping a quantity of bacon ends, forming an emulsion containing a predominant portion of the chipped bacon end pieces and ground meat addition pieces wherein the ratio of meat addition pieces to bacon end pieces is in the order of about 80 pounds bacon end pieces to at least 7 pounds meat addition pieces, the meat addition pieces being high in gelatin and protein content and selected from the group consisting of ham shanks and picnic hams, thoroughly mixing said emulsion with an amount of protein grease retaining filler sufficient to prevent excessive shrinkage during cooking, at least about 1 pound egg white as a binder, and about 10-25 pounds of water, maintaining the emulsion at a temperature in the range of about 10° F. to about 50° F. during said forming and mixing steps, and forming said mixture into desired shapes.

2. The method of claim 1 wherein said bacon end pieces weigh at least about 2 ounces.

3. The method of claim 1 wherein said bacon end pieces weigh in the range of about 6 to 8 ounces per piece.

4. The method of claim 1 wherein the meat addition pieces are comminuted ham shanks.

* * * * *